United States Patent

[11] 3,619,778

| [72] | Inventor | Edwin L. Schwartz<br>Los Angeles, Calif. |
|---|---|---|
| [21] | Appl. No. | 8,667 |
| [22] | Filed | Feb. 4, 1970 |
| [45] | Patented | Nov. 9, 1971 |
| [73] | Assignee | Rite Autotronics Corporation<br>Los Angeles, Calif. |

[54] ADJUSTING DEVICE FOR AN ELECTRICAL MEASURING INSTRUMENT
2 Claims, 4 Drawing Figs.

| [52] | U.S. Cl. | 342/154 R |
|---|---|---|
| [51] | Int. Cl. | G01r 1/00 |
| [50] | Field of Search | 324/146, 154, 157 |

[56] References Cited
UNITED STATES PATENTS

| 2,954,526 | 9/1960 | Pfeffer et al. | 324/154 X |
|---|---|---|---|
| 2,514,745 | 7/1950 | Dalzell | 324/157 X |

*Primary Examiner*—Alfred E. Smith
*Attorney*—Robert E. Geauque

ABSTRACT: An adjusting device having a knob and an adjusting shaft which are concentric and accessible from the exterior of an electrical measuring instrument. The knob positions a preset pointer at a selected value on the scale of the instrument and the adjusting shaft independently locates a control magnet for zero adjustment of the instrument. The control magnet is rotatably retained in a U-shaped front wall of a bracket which is opposite the end of the adjusting shaft. The knob and adjusting shaft are mounted in a face panel of the instrument to be rotated independently of one another.

PATENTED NOV 9 1971

3,619,778

EDWIN L. SCHWARTZ
INVENTOR.

BY R. E. Geauque
ATTORNEY

ADJUSTING DEVICE FOR AN ELECTRICAL MEASURING INSTRUMENT

BACKGROUND OF THE INVENTION

1. Field of the Invention

This invention relates to electrical measuring instruments in which permanent magnets are located in the field of a coil which receives the electrical signal to be measured. The magnets move a pointer relative to a fixed scale as the value of the signal changes. In such meters, a control magnet can be provided which is positioned relative to the magnets on the movable pointer in order to provide a zero adjustment of the pointer. Also, electrical measuring instruments of this type can be equipped with a second preset pointer which can be set at a predetermined location to indicate when the movable pointer is at the predetermined location.

2. Description of the Prior Art

A combination knob mechanism located exteriorly of an electrical measuring instrument is described in U.S. Pat. No. 2,954,526. The instrument has a single pointer and the knob mechanism provides zero adjustment as well as calibration of the instrument. Also, zero adjustment has been obtained by a part of a knob mechanism which varies the force of a spring on the pointer shaft.

SUMMARY OF THE INVENTION

The present invention relates to an adjusting device for an electrical measuring instrument in which both a preset pointer can be positioned and zero adjustment can be accomplished by a single knob mechanism accessible on the exterior of the instrument. The knob mechanism incorporates an exterior knob which extends into the instrument and is rotated to position the preset pointer. The knob contains a central opening for receiving an adjusting shaft which extends into the instrument past the end of the knob and connects with a control magnet. Since the shaft can be rotated independently of the knob, the setting of the preset pointer and the zero adjustment can be accomplished independently of one another.

The interior end of the knob is inserted into an opening in an enlarged end of the preset pointer and the end is keyed to the knob to rotate therewith. Further, the enlarged end of the preset pointer is held in keyed position by a snap ring which also holds the adjusting shaft within the knob.

In order to facilitate the mounting of the control magnet, a bracket is attached to the frame which supports the movable pointer shaft. The bracket has a U-shaped front wall which is spaced from the frame by two legs attached to the frame at opposite sides. A portion of the moving pointer can pass between the legs without interference with the pointer movement. The U-shaped front wall has a circular side opening for receiving a circular projection on a side of the control magnet so that the control magnet is free to rotate in the U-shaped wall while still being retained within the wall. The structure of the adjusting device provides a compact single knob mechanism which is economical to manufacture and assemble and results in minimum obstruction on the exterior of the instrument.

It is therefore an object of the present invention to provide an adjusting device for an electrical measuring instrument in which a single knob mechanism accomplishes both zero adjustment of the instrument and positioning of a preset pointer.

Another object of the invention is to provide an adjusting device in which a knob positions the preset pointer and a shaft extending through the knob makes the zero adjustment of the meter by positioning a control magnet rotatably on a separate bracket.

These and other objects of the invention will be apparent from the accompanying description and drawings.

DESCRIPTION OF THE PREFERRED EMBODIMENT

Figure 1:
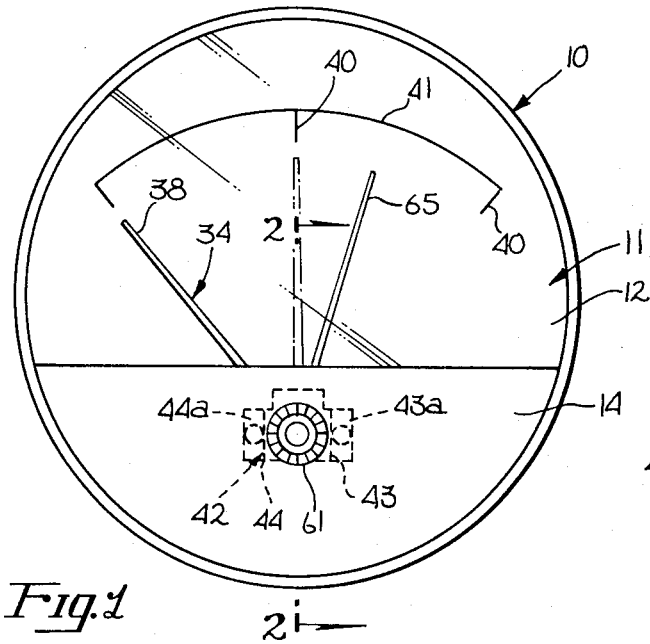
FIG. 1 is a front elevational view of an electrical measuring instrument showing the moving pointer, the preset pointer and the knob mechanism.
Figure 3:
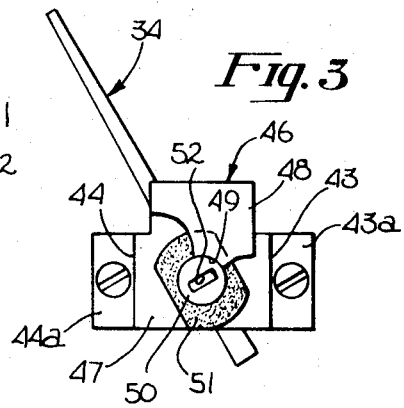
FIG. 3 is a section along line 3—3 of FIG. 2 showing the control magnet for zero adjustment.
Figure 2:
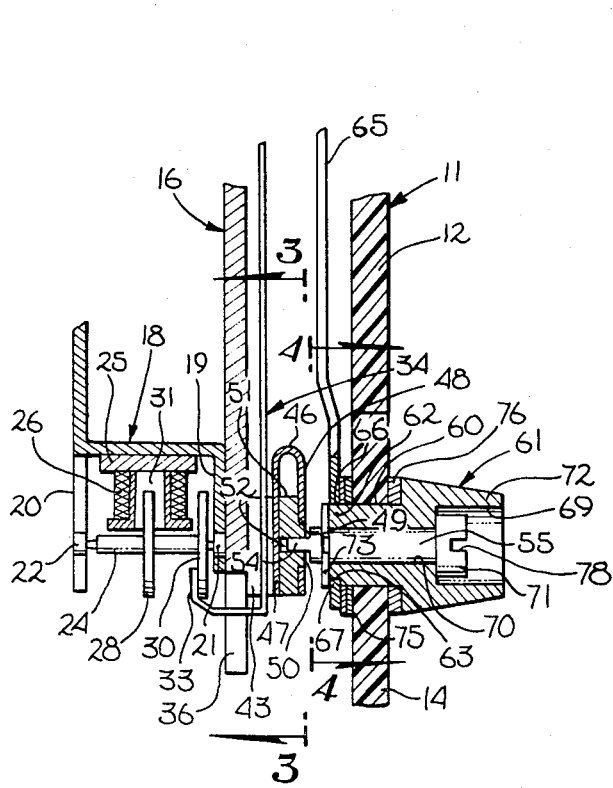
FIG. 2 is a vertical section alone line 2—2 of FIG. 1 illustrating the knob and adjusting shaft of the single knob mechanism.
Figure 4:
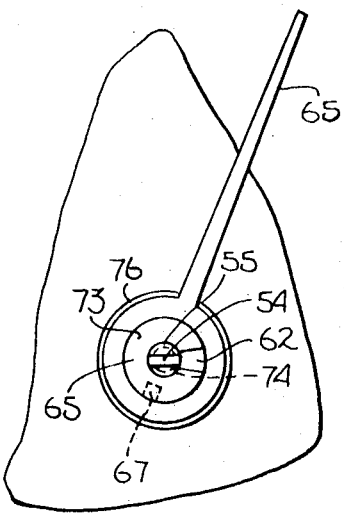
FIG. 4 is a section along line 4—4 of FIG. 2 showing the preset pointer.

The electrical instrument chosen for purpose of illustration consists of a tachometer 10 having a front face panel 11, the upper portion 12 being transparent and the lower portion 14 being opaque. The instrument is enclosed by a shell (not shown) of standard construction and has an interior frame 16 attached to the shell. A bracket 18 is attached to the back side of the frame 16 in any suitable manner and has legs 19 and 20 which carry bearings 21 and 22, respectively, for moving pointer shaft 24. Also, insulated block 25 is attached to frame 18 and supports a coil 26 which receives the input electrical signal through suitable electrical leads (not shown).

Two permanent magnet armatures 28 and 30 are supported on pointer shaft 24 and the armature 28 moves in chamber 31 within coil 25. Armature 30 is at the end of shaft 24 and end 33 of moving pointer 34 is attached thereto. The pointer 34 extends from end 33 through a slot 36 in frame 16 and then upwardly along the front face of the frame 16. End 38 of the pointer cooperates with indicia 40 of scale 41 on the front face of the frame. When the electrical signal to coil 26 changes, the shaft 24 will rotate and change the position of the pointer end 38 to provide a new reading. In the tachometer 10, the input signal will be connected to a transducer producing a signal proportioned to engine rotational speed, but it is understood that an input signal proportioned to another variable can be measured by the electrical instrument 10.

A bracket 42 has legs 43 and 44 which terminate in flanges 43a and 44a attached to the front of frame 16. Front wall 46 of the bracket is U-shaped and has one side 47 connected to legs 43 and 44. The other side 48 has a circular opening 49 which receives circular projection 50 on a control magnet 51 which is located between sides 47 and 48. The magnet 51 also contains a slot 52 which receives the flattened end 54 of adjusting shaft 55. Thus, rotation of shaft 55 will rotate the control magnet 51 while the magnet is retained in front wall 46 by projection 50. Since the plane of the control magnet is perpendicular to the axis of shaft 55, no binding of the control magnet in the front wall 46 will occur.

The bottom portion 14 of front panel 11 contains an opening 60 which receives the shank of knob 61. End 62 projects into the interior of the instrument and contains a surface notch 63. A preset pointer 65 contains an opening 66 which snugly fits the knob end 62 and a key 67 extends inwardly from the opening into notch 63 so that pointer 65 can be rotated by knob 61 with respect to the scale 41. Shaft 55 extends coaxially with knob 61 through a central opening 70 in the knob and shaft head 71 abuts the bottom of cavity 69 in knob head 72. The shaft 55 adjacent end 54 contains a groove 74 for receiving snap ring 73 and the snap ring is large enough to overlap the key 67 in order to retain preset pointer 65 on knob end 62. Spacing washers 75 and 76 position the preset pointer 65 adjacent the knob end 62 and adjacent the snap ring 73. The key 67 and snap ring 73 retain the adjusting shaft 55 and knob 61 within the lower section 14 of the face panel 11 while permitting the knob and shaft to rotate independently of one another.

The shaft head 71 contains a slot 78 to receive a tool which can rotate the shaft 55 relative to the knob 61. The friction acting on knob 61 and shaft 55 is great enough to hold these parts in any set position but still permit one to be rotated without rotating the other.

In operation, the moving pointer 34 will be positioned along scale 41 in accordance with the value of the input signal to coil 26, which in a tachometer is proportioned to engine revolutions. In operation of the engine, it is desirable to change gears at a predetermined engine speed. Therefore, the preset pointer 65 can be set at the gear change speed on the scale 41 by rotation of knob 61 and thereafter, when pointer 34 becomes opposite pointer 65, the operator will be reminded to shift gears. Also, when no input signal is received, it is important that the moving pointer 34 read zero on scale 41. The zero adjustment is accomplished by rotating adjusting shaft 55 with a suitable tool to position control magnet 51 relative to the other permanent magnets of the instrument until the pointer 34 is opposite zero on the scale. This is accomplished by having the polarity of the control magnet such as to produce a retarding force on the rotation of the other permanent magnets. The adjusting shaft 55 is coaxial with the pointer shaft 24 and the control magnet is coaxial with the other permanent signals, although displaced therefrom.

Since the shaft head 71 is recessed in the knob 61, the shaft cannot be accidentally moved during operation of the instrument 10. Both the knob 61 and the shaft 55 are accessible from the exterior of the instrument for easy adjustment. Also, both of these components can be constructed of a nonconductive material so as not to influence the reading of the instrument. The knob mechanism is easily installed on the face 11 of the instrument before the flattened end 54 is inserted into the control magnet.

I claim:

1. In an electrical measuring instrument having a moving pointer cooperating with a measuring scale and moved by the coaction between permanent magnets on the pointer shaft and the field of a coil receiving the input to the meter, the instrument having a face panel and an interior frame, the improvement comprising a single knob mechanism for adjusting the zero reading of said moving pointer and the location of a preset pointer, said adjusting mechanism comprising a knob extending through said face panel of said instrument and having a head located on the exterior side of said face panel and an end located on the interior side of said face panel;
   an adjusting shaft extends coaxially through said knob and is longitudinally fixed in respect to said knob, said adjusting shaft having an end located interiorly of said face panel beyond said end of said knob and an enlarged head end located exteriorly of said face panel;
   a bracket mounted on said interior frame and having a front wall opposite said end of said adjusting shaft, said bracket being U-shaped having a pair of substantially parallel longitudinally spaced-apart leg elements, said adjusting shaft extending through an opening within said front wall;
   a control magnet rotatably mounted in respect to said front wall in a plane perpendicular to the axis of said adjusting shaft and coaxially with said moving pointer shaft;
   said opening within said front wall to effect attachment of said end of said adjusting shaft to said control magnet; and
   a preset pointer attached to said end of said knob for positioning said preset pointer by said knob opposite a selected value on said measuring scale.

2. In an electrical measuring instrument as defined in claim 1 wherein said bracket has laterally spaced-apart legs on opposite sides thereof for spacing said front wall from said interior frame and thereby providing a space for passage of said moving pointer along said frame.

* * * * *